United States Patent [19]

Foulkes

[11] 4,018,909

[45] Apr. 19, 1977

[54] SEMI-MOIST PET FOOD CONTAINING CORN MOLASSES

[75] Inventor: Peter H. Foulkes, Fox River Grove, Ill.

[73] Assignee: The Quaker Oats Company, Chicago, Ill.

[22] Filed: Nov. 20, 1975

[21] Appl. No.: 633,803

[52] U.S. Cl. .............................. 426/532; 426/332; 426/335; 426/641; 426/646; 426/805; 426/658

[51] Int. Cl.² .......................................... A23K 1/02

[58] Field of Search ................. 426/1, 2, 623, 630, 426/635, 658, 805, 641, 532, 332, 335

[56] References Cited

UNITED STATES PATENTS

| | | | |
|---|---|---|---|
| 3,202,514 | 8/1965 | Burgess et al. | 426/805 |
| 3,246,336 | 4/1966 | Baribo et al. | 426/2 |
| 3,653,908 | 4/1972 | Buck et al. | 426/805 |

*Primary Examiner*—Jeanette M. Hunter
*Attorney, Agent, or Firm*—Mathew R. P. Perrone, Jr.

[57] ABSTRACT

A semi-moist pet food using corn molasses as a partial replacement for the sugar content thereof improves in palatability upon aging.

9 Claims, No Drawings

SEMI-MOIST PET FOOD CONTAINING CORN MOLASSES

BACKGROUND OF THE INVENTION

This invention relates to a semi-moist pet food and more particularly to a semi-moist pet food containing corn molasses.

In the field of pet foods, there are three basic subdivisions — dry pet food, semi-moist pet food, and moist pet food. Dry pet food contains less than about 15 percent moisture. Semi-moist pet food contains from about 15 percent to about 50 percent moisture. Moist pet food contains above about 50 percent moisture. By "moisture" is meant the water combined with the components of the pet food in addition to the free water added, if any. Each class of pet food has a particular utility and has particular advantages and disadvantages. The semi-moist pet food tends to maximize the advantages of both the dry and the moist pet foods while minimizing the disadvantages.

Within the semi-moist pet food field, sugar is recognized as a major component of the semi-moist pet food. There are many common edible sugars which are used in pet food. Dextrose, sucrose and other suitable sugars are typical examples of the sugars used in the semi-moist pet food. These sugars contribute to the stability of the semi-moist pet food by affecting the water activity of the pet food. Thus, it can be seen that sugar is an important ingredient for use in semi-moist pet foods.

Sugar is now not as readily available due to a variety of economic conditions. With this lack of availability, the economic advantages of using sugar in a pet food have correspondingly decreased. As is customary, when problems arise such as the use of sugar in semi-moist pet foods, research is directed to the solution of that problem. The solution is customarily toward replacement or reducing of the component which is no longer suitable for use. The replacement must maintain the good qualities of that component which it replaces while providing a solution to the problems which cause the search for the replacement in the first place. Sugar contributes to the stability and to the flavor of a semi-moist pet food. It follows that a suitable replacement for part or all of the sugar must provide the flavor and stability that the sugar does at a reduced cost.

Another problem in the semi-moist pet food is that flavor or palatability either remains almost the same with only a slight decrease or decreases substantially during storage. Because this semi-moist pet food is either stored or remains unused for a period of months after the formation thereof, it is critical that the flavor be maintained or increased. However, the best effort has led only to attempts to achieve substantial maintenance of flavor. Even then, some decrease in the flavor and palatability of the pet food is customary over the storage period. Thus, the flavor and economic factors play an important role in the formation of a semi-moist pet food.

Polyhydric components also tend to make the pet food bitter in some cases. Yet these components are critical for semi-moist pet food stability. It is, therefore, desirable to reduce pet food bitterness, while maintaining the desired stability.

SUMMARY OF THE INVENTION

Therefore, it is an object of this invention to provide an improved semi-moist pet food having improved flavor.

It is a further object of this invention to provide an economical, improved semi-moist pet food.

It is a still further object of this invention to provide an improved semi-moist pet food having the desired stability.

It is yet a further object of this invention to provide an improved semi-moist pet food having a palatability increase upon storage.

Another object of this invention is to reduce pet food bitterness.

These and other objects of this invention are achieved by replacing at least part of the sugar in the semi-moist pet food with corn molasses. Bitterness is reduced by using sorbitol in the pet food.

DESCRIPTION OF THE PREFERRED EMBODIMENTS

A semi-moist pet food having corn molasses as a partial replacement for the sugar content thereof provides a semi-moist pet food having all the desired attributes of semi-moist pet food plus the additional attribute of improved palatability upon storage.

Corn molasses can comprise about 3 to about 18 percent by weight of the semi-moist pet food. More preferably, about 5 to about 15 percent corn molasses by weight of the semi-moist pet food is used. Most preferably 8 to 10 percent by weight of the semi-moist pet food is corn molasses. The most preferable range is suitable because the effect of corn molasses is maximized and the semi-moist pet food shows the most improvement at this concentration. The corn molasses replaces only a part of the sugar in the semi-moist pet food.

The total sugar content of the semi-moist pet food of this invention comprises about 6 percent to about 30 percent by weight of the semi-moist pet food. Preferably, about 10 percent to about 25 percent by weight of the semi-moist pet food is suitable. More preferably, about 13 to about 20 percent by weight of the semi-moist pet food is the sugar component. At no time does the amount of corn molasses in the formulation exceed the amount of sugar in the formulation. The sugar suitable for use in the semi-moist pet food is any edible sugar or low molecular weight polysaccharide. Typical examples of the sugars used in pet foods include dextrose, glucose, sucrose, or corn syrup. The sugar and corn molasses combination provides the sweetness for the semi-moist pet food. Furthermore, the corn molasses component permits improved palatability upon storage.

While it is feasible as a result of this invention to use corn molasses as a partial sugar replacement in any known semi-moist pet food which contains sugar to thereby provide both the attribute of sugar and the attribute of improved flavor and palatability upon storage, there is, nevertheless, this especially suitable semi-moist pet food which can include this corn molasses ingredient for the purpose of maintaining all desirable aspects of a semi-moist pet food while providing a semi-moist pet food which improves in flavor as storage time increases. Customarily, in a semi-moist pet food, ingredients include meat and meat by-products, vegetable protein, a stabilizer, salt, binder, fat and some nutritional additives.

Typically, the semi-moist pet food of this invention includes meat or meat by-products, or combinations thereof. By meat is meant the flesh of cattle, swine, sheep goats, horses, whale and other mammals, poultry, and fish. By meat by-products is meant those things accepted by Title 9, Chapter 1, Subchapter H of the Code of Federal Regulations, 1971 Edition and also to include meat and bone meal, fish meal, fish protein concentrate, poultry by-products and blood meal. An especially suitable meat by-product on the basis of cost, flavor and palatability for the purpose of this invention is beef tripe. The meat content of the semi-moist food ranges from 0 to about 45 or more usually about 16 to about 40 percent. More preferably the meat content of about 20–35 percent is suitable. Most preferably a meat content of 28–33 percent is suitable due to the palatability maximization and cost minimization at this meat concentration.

The vegetable protein suitable for use in the semi-moist pet food of this invention is basically unrestricted. Any known vegetable protein which is edible can be used for this invention. These additives include peanut grits, peanut flour, cottonseed protein, and other proteins. Also, the soy proteins are especially suitable because they are the most readily available for use. They also have a high protein content which adds to the protein capabilities of the food. At least one vegetable protein is suitable for use. More preferably a highly suitable combination is soy grits and soy flour for use in the pet food. The soy grits provide a coarseness which permits a firmer product. The soy flour provides a water binder. Generally, soy grits comprise about 15 percent to about 25 percent by weight of the composition. Soy flour comprises about 10 percent to about 20 percent by weight of the semi-moist pet food. Generally speaking, the total vegetable protein content ranges from about 15 percent to about 45 percent by weight of the semi-moist pet food. More preferably, about 25 to about 40 percent by weight of the semi-moist pet food is vegetable protein. Most preferably about 34 percent to about 38 percent by weight of the semi-moist pet food is vegetable protein. At the most preferred range, the availability of the vegetable protein is maximized, and the taste and palatability of the semi-moist pet food is maintained. It is possible to completely replace meat or meat by-product with vegetable protein and provide a meatless semi-moist pet food having sufficient protein content.

The stabilizer for the semi-moist pet food of this invention is a three component stabilizer comprising at least one polyhydric component, at least one food grade acid, and at least one antimycotic. Typical polyhydric components which are used as a stabilizer include those listed in U.S. Pat. No. 3,741,774 to Burkwall incorporated herein by reference. Of the polyhydric components, propylene glycol is the most effective at a concentration of about 2 to about 8 percent by weight of the semi-moist pet food. However, propylene glycol may impart a somewhat bitter taste to the semi-moist pet food. While it is not desired to be bound by any theory, this bitter taste may result from a propylene glycol-corn molasses reaction. Therefore, it is advantageous to include in the semi-moist pet food about 1 to about 3 percent sorbitol. Sorbitol in combination with propylene glycol is now known as a result of this invention to provide both stability and a less bitter, or sweet taste for the semi-moist pet food. This sweet taste counteracts the possible bitter taste which may be imparted by propylene glycol.

In combination with the polyhydric component, a food grade acid is an important component as a part of the stabilizer. Up to about 1 percent by weight of the semi-moist pet food is included for stabilizing purposes. Typical acids for stabilizing purposes include the edible acids such as phosphoric acid, hydrochloric acid, citric acid, and acetic acid. However, among the edible acids, phosphoric acid is the best acid for the process because it provides both a phosphate content nutritional value and avoids a corrosive action on the processing material.

Up to about 0.5 percent of an antimycotic is included in combination with the polyhydric component and the acid to provide the stabilizer. Typical antimycotics act with the acid to assert the greatest possible activity of yeast and mold growth. Typical edible antimicrobial acids and acid salts include ascorbic acid, the benzoates, the parabans, propionates and acetates. However, potassium sorbate is the preferred antimycotic because it is the most effective and provides the potassium nutrient value.

Also included in the semi-moist pet food is up to about 5 percent of at least one salt. Preferably, a mixture of salts is used. Any typical food grade salt is suitable for use in this invention. The salts include the phosphate salts and the alkaline earth or alkali metal salts. A preferred phosphate salt is the dicalcium phosphate salt. This phosphate salt provides the calcium nutrient, the phosphate nutrient, and additionally acts as both a water binder and buffered stabilizer. Sodium chloride and potassium chloride are also suitable salts and in fact may be included in combination with the phosphates. Semi-moist pet food contains up to about 4 percent of the phosphate salts, and up to about 1 percent of the sodium chloride. These preferences are made on the basis of availability and utility in the nutritional value.

When a water binder and stabilizer is needed, the only suitable compound for use in to this pet food is the sodium carboxymethyl cellulose. Accepted equivalents for sodium carboxymethyl cellulose do not provide the necessary stability and water binding capabilities for the semi-moist pet food of this invention. The sodium carboxymethyl cellulose provides the binder and the stabilizing ingredients of the pet food in addition to the other qualities. Up to about 2 percent is suitable with up to 1 percent being more preferred, and up to 0.5 percent being most preferred.

Up to about 10 percent of the semi-moist pet food is fat. Typical fat for use in the semi-moist pet food include prime steam lard, tallow, and choice white grease. The addition of fat is flexible and varies with the fat content in the meat or meat by-product component of the semi-moist pet food. As the fat content in the meat component increases, the lower amount of fat can be added to provide a suitable material.

Various vitamin and mineral mixes are also included in this food along with any suitable dye which is acceptable for food use. These additives of vitamin and mineral mixes are present in an amount up to about 0.5 percent.

While it is not intended to be bound by any particular theory, it is nevertheless believed that corn molasses when used in this formulation and extruded in a standard fashion such as that manner described in U.S. Pat.

No. 3,765,902 to Charter and U.S. Pat. No. 3,380,832 to Bone and stored at ambient temperature provides compounds which enhance palatability.

Having thus fully described and disclosed the invention sought to be patented, the following examples are presented to illustrate without unduly limiting the claimed invention. All parts and percentages are by weight unless otherwise specified.

EXAMPLE 1

The following ingredients are collected:

Table I

| Ingredients | % of Formula |
|---|---|
| Beef Tripe | 30.00 |
| Soy Grits | 20.00 |
| Soy Flour | 16.00 |
| Sugar | 14.01 |
| Corn Molasses | 9.00 |
| Propylene Glycol | 4.00 |
| Dicalcium Phosphate | 2.75 |
| Prime Steam Lard | 2.75 |
| Salt | 0.70 |
| Phosphoric Acid | 0.25 |
| Sodium Carboxymethylcellulose | 0.25 |
| Potassium Sorbate | 0.10 |
| Vitamin Mix | 0.10 |
| Mineral Mix | 0.07 |
| Red Coloring | 0.02 |
| | 100.00 |

The dry ingredients from the above-listed ingredients are blended. Then, the wet ingredients are blended in with the dry ingredients. After that point, the meat ingredients are added. After addition of the meat ingredients the corn molasses is added. These components are blended to form a dough and extruded according to the process set forth in the above-referenced patents which are incorporated herein by reference. The resultant product is stored and has enhanced palatability upon storage.

EXAMPLE 2

A feeding test is carried out comparing a semi-moist pet food with 9.00 percent corn molasses replacing an equal amount of sugar with a semi-moist pet food having the following formulation of Table II.

Table II

| Control | % of Formula |
|---|---|
| Meat & Meat By-Products | 30.00 |
| Sugar | 23.00 |
| Soy Grits | 20.00 |
| Soy Flour | 16.00 |
| Propylene Glycol | 4.00 |
| Dicalcium Phosphate | 2.75 |
| Animal Fat | 2.73 |
| Salt | 0.70 |
| Acid | 0.25 |
| Sodium Carboxymethylcellulose | 0.25 |
| Potassium Sorbate | 0.10 |
| Vitamin Mix | 0.10 |
| Mineral Mix | 0.10 |
| Color Blend | 0.02 |
| | 100.00 |

The pet food of the invention is the same as the control, except that in the control, 23.00 percent sugar is replaced with 14 percent sugar and 9 percent corn molasses to form a pet food of this invention.

The feeding results are reported in Table III.

Table III

| Preference Feeding Results | | | |
|---|---|---|---|
| Time | No.Dogs | Ave. % Consumed | Significant |
| Control VS. | 0 | 60 | 43 | 95 % |
| Control W/ 9% Corn Molasses | | | 57 % | |
| Control VS. | 3 Mos. | 60 | 40 % | 99 % |
| Control W/ 9% Corn Molasses | | | 60 % | |
| Control VS. | 6 Mos. | 60 | 31 % | 99 % |
| Control W/ 9% Corn Molasses | | | 69 % | |

Corn molasses replaces an equal amount of sugar and is based on the weight of the pet food.

EXAMPLE 3

The pet food of Example 1 is formulated using 2 percent sorbitol. Bitterness of the pet food is reduced.

Having fully described this new and unique invention it is claimed:

1. In a semi-moist pet food containing sugar, the improvement wherein the pet food further comprises about 3 percent to about 18 percent corn molasses as a replacement for at least part of the sugar and about 6 percent to about 30 percent sugar by weight of the pet food, provided however, that the weight percent of the sugar is greater than the weight percent of the corn molasses to thereby provide a pet food having improved palatability upon storage.

2. The semi-moist pet food of claim 1, wherein the corn molasses comprises about 5 percent to about 15 percent and the sugar comprises 10 percent to 25 percent by weight of the pet food.

3. The semi-moist pet food of claim 1, wherein the corn molasses comprises about 8 percent to about 10 percent and the sugar comprises 13 percent to 20 percent by weight of the pet food.

4. A semi-moist pet food comprising:
   a. 5 percent to 15 percent corn molasses;
   b. 6 percent to 30 percent of at least one sugar;
   c. 16 percent to 40 percent of at least one meat or meat by-product;
   d. 15 percent to 45 percent of at least one vegetable protein;
   e. 2 percent to 8 percent of at least one polyhydric component;
   f. up to about 1 percent of at least one edible acid;
   g. up to about 0.5 percent of at least one antimycotic;
   h. up to about 10 percent of at least one fat; and
   i. up to about 5 percent of at least one salt all percentages being based on the weight of the pet food.

5. The pet food of claim 4 comprising 2 percent to 8 percent propylene glycol and 1 percent to 3 percent sorbitol.

6. The pet food of claim 5 wherein the antimycotic is potassium sorbate.

7. The pet food of claim 6 wherein the vegetable protein comprises about 15 percent to about 25 percent soy grits and about 10 percent to about 20 percent soy flour.

8. The pet food of claim 7 further comprising up to 2 percent sodium carboxymethylcellulose.

9. The pet food of claim 4 further comprising up to 1 percent sodium carboxymethylcellulose.

* * * * *